United States Patent
Accapadi et al.

(10) Patent No.: US 7,676,808 B2
(45) Date of Patent: *Mar. 9, 2010

(54) SYSTEM AND METHOD FOR CPI LOAD BALANCING IN SMT PROCESSORS

(75) Inventors: Jos Manuel Accapadi, Austin, TX (US); Andrew Dunshea, Austin, TX (US); Dirk Michel, Austin, TX (US); Mysore Sathyanarayana Srinivas, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 245 days.

This patent is subject to a terminal disclaimer.

(21) Appl. No.: 11/955,503

(22) Filed: Dec. 13, 2007

(65) Prior Publication Data

US 2008/0098397 A1    Apr. 24, 2008

Related U.S. Application Data

(63) Continuation of application No. 10/671,057, filed on Sep. 25, 2003, now Pat. No. 7,353,517.

(51) Int. Cl.
    *G06F 9/46* (2006.01)

(52) U.S. Cl. ..................... 718/102; 718/107
(58) Field of Classification Search ................. 718/102, 718/107
    See application file for complete search history.

(56) References Cited

U.S. PATENT DOCUMENTS 6,928,482 B1 *   8/2005   Nun et al. ................... 709/235

* cited by examiner

*Primary Examiner*—Thomas Lee
*Assistant Examiner*—Camquy Truong
(74) *Attorney, Agent, or Firm*—VanLeeuwen & VanLeeuwen; Matthew B. Talpis

(57) ABSTRACT

A system and method for scheduling threads in a Simultaneous Multithreading (SMT) processor environment utilizing multiple SMT processors is provided. Poor performing threads that are being run on each of the SMT processors are identified. After being identified, the poor performing threads are moved to a different SMT processor. Data is captured regarding the performance of threads. In one embodiment, this data includes each threads' CPI value. When a thread is moved, data regarding the thread and its performance at the time it was moved is recorded along with a timestamp. The data regarding previous moves is used to determine whether a thread's performance is improved following the move.

16 Claims, 12 Drawing Sheets

SYSTEM AND METHOD FOR CPI LOAD BALANCING IN SMT PROCESSORS

RELATED APPLICATIONS

This application is a continuation application of U.S. Non-Provisional patent application Ser. No. 10/671,057, entitled "System and Method for CPI Load Balancing in SMT Processors," filed on Sep. 25, 2003 now U.S. Pat. No. 7,353,517.

BACKGROUND OF THE INVENTION

1. Technical Field

The present invention relates in general to a system and method for scheduling threads on SMT processors. More particularly, the present invention relates to a system and method that uses a measurement to determine processing threads that are compatible with one another for SMT scheduling purposes.

2. Description of the Related Art

The fundamental structure of a modern computer includes peripheral devices to communicate information to and from the outside world; such peripheral devices may be keyboards, monitors, tape drives, communication lines coupled to a network, etc. Also included in the basic structure of the computer is the hardware necessary to receive, process, and deliver this information from and to the outside world, including busses, memory units, input/output (I/O) controllers, storage devices, and at least one central processing unit (CPU), etc. The CPU is the brain of the system. It executes the instructions which comprise a computer program and directs the operation of the other system components.

From the standpoint of the computer's hardware, most systems operate in fundamentally the same manner. Processors actually perform very simple operations quickly, such as arithmetic, logical comparisons, and movement of data from one location to another. Programs which direct a computer to perform massive numbers of these simple operations give the illusion that the computer is doing something sophisticated. What is perceived by the user as a new or improved capability of a computer system, however, may actually be the machine performing the same simple operations, but much faster. Therefore continuing improvements to computer systems require that these systems be made ever faster.

One measurement of the overall speed of a computer system, also called the throughput, is measured as the number of operations performed per unit of time. Conceptually, the simplest of all possible improvements to system speed is to increase the clock speeds of the various components, particularly the clock speed of the processor. If everything runs twice as fast but otherwise works in exactly the same manner, the system will perform a given task in half the time. Computer processors which were constructed from discrete components years ago performed significantly faster by shrinking the size and reducing the number of components; eventually the entire processor was packaged as an integrated circuit on a single chip. The reduced size made it possible to increase the clock speed of the processor, and accordingly increase system speed.

Despite the enormous improvement in speed obtained from integrated circuitry, the demand for ever faster computer systems still exists. Hardware designers have been able to obtain still further improvements in speed by greater integration, by further reducing the size of the circuits, and by other techniques. Designers, however, think that physical size reductions cannot continue indefinitely and there are limits to continually increasing processor clock speeds. Attention has therefore been directed to other approaches for further improvements in overall speed of the computer system.

Without changing the clock speed, it is still possible to improve system speed by using multiple processors. The modest cost of individual processors packaged on integrated circuit chips has made this practical. The use of slave processors considerably improves system speed by off-loading work from the master processor to the slave processor. For instance, slave processors routinely execute repetitive and single special purpose programs, such as input/output device communications and control. It is also possible for multiple CPUs to be placed in a single computer system, typically a host-based system which services multiple users simultaneously. Each of the different CPUs can separately execute a different task on behalf of a different user, thus increasing the overall speed of the system to execute multiple tasks simultaneously.

It is more difficult, however, to improve the speed at which a single task, such as an application program, executes. Coordinating the execution and delivery of results of various functions among multiple CPUs is a tricky business. For slave I/O processors this is not so difficult because the functions are pre-defined and limited but for multiple CPUs executing general purpose application programs it is much more difficult to coordinate functions because, in part, system designers do not know the details of the programs in advance. Most application programs follow a single path or flow of steps performed by the processor. While it is sometimes possible to break up this single path into multiple parallel paths, a universal application for doing so is still being researched. Generally, breaking a lengthy task into smaller tasks for parallel processing by multiple processors is done by a software engineer writing code on a case-by-case basis. This ad hoc approach is especially problematic for executing commercial transactions which are not necessarily repetitive or predictable.

Thus, while multiple processors improve overall system performance, there are still many reasons to improve the speed of the individual CPU. If the CPU clock speed is given, it is possible to further increase the speed of the CPU, i.e., the number of operations executed per second, by increasing the average number of operations executed per clock cycle. A common architecture for high performance, single-chip microprocessors is the reduced instruction set computer (RISC) architecture characterized by a small simplified set of frequently used instructions for rapid execution, those simple operations performed quickly as mentioned earlier. As semiconductor technology has advanced, the goal of RISC architecture has been to develop processors capable of executing one or more instructions on each clock cycle of the machine. Another approach to increase the average number of operations executed per clock cycle is to modify the hardware within the CPU. This throughput measure, clock cycles per instruction, is commonly used to characterize architectures for high performance processors. Instruction pipelining and cache memories are computer architectural features that have made this achievement possible. Pipeline instruction execution allows subsequent instructions to begin execution before previously issued instructions have finished. Cache memories store frequently used and other data nearer the processor and allow instruction execution to continue, in most cases, without waiting the full access time of a main memory. Some improvement has also been demonstrated with multiple execution units with look ahead hardware for finding instructions to execute in parallel.

For both in-order and out-of-order completion of instructions in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be completed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for main memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

Another technique to improve the efficiency of hardware within the CPU is to divide a processing task into independently executable sequences of instructions called threads. This technique is related to breaking a larger task into smaller tasks for independent execution by different processors, except here the threads are to be executed by the same processor. When a CPU then, for any of a number of reasons, cannot continue the processing or execution of one of these threads, the CPU switches to and executes another thread. The term "multithreading" as defined in the computer architecture community is not the same as the software use of the term which means one task subdivided into multiple related threads. In the architecture definition, the threads may be independent. Therefore "hardware multithreading" is often used to distinguish the two uses of the term.

Traditional forms of hardware multithreading involves replicating the processor registers for each thread. For instance, for a processor implementing the architecture provided by the IBM Corporation under the trade name PowerPC™ to perform multithreading, the processor must maintain N states to run N threads. Accordingly, the following are replicated N times: general purpose registers, floating point registers, condition registers, floating point status and control register, count register, link register, exception register, save/restore registers, and special purpose registers.

Additionally, the special buffers, such as a segment lookaside buffer, can be replicated or each entry can be tagged with the thread number and, if not, must be flushed on every thread switch. Also, some branch prediction mechanisms, e.g., the correlation register and the return stack, should also be replicated. Fortunately, there is no need to replicate some of the larger functions of the processor such as: level one instruction cache (L1 I-cache), level one data cache (L1 D-cache), instruction buffer, store queue, instruction dispatcher, functional or execution units, pipelines, translation lookaside buffer (TLB), and branch history table.

Simultaneous multithreading (SMT) is a technique that permits multiple independent threads to issue multiple instructions each cycle to a superscalar processor's functional units. SMT combines the multiple-instruction features of modern superscalar processors with the latency-hiding ability of multithreaded architectures. Unlike conventional multi-threaded architectures, which depend on fast context switching to share processor execution resources, all hardware contexts in an SMT processor are active simultaneously, competing each cycle for all available resources. This dynamic sharing of the functional units allows simultaneous multithreading to substantially increase throughput, attacking the two major impediments to processor utilization—long latencies and limited per-thread parallelism. Multiple SMT processors can be included in a computer system allowing the computer to perform simultaneous multithreading on a plurality of computers.

A challenge, however, faced by computers with a plurality of SMT processors is that the software threads being executed by the SMT processor contend for some of the same processor-based resources, such functional and execution units. As used herein, the term "thread" refers to a software thread, unless otherwise noted. If two threads are both repeatedly contending for the same processor-based resource, one thread will wait (or gets swapped out) while the other thread uses the resource. Waiting for resources decreases overall system throughput as well as the efficiency of the individual threads. In a multi-processor environment, a thread may not perform well on a given SMT processor because of the other threads that are running on that processor. However, traditional systems do not move threads from one SMT processor to another.

What is needed, therefore, is a system and method that identifies threads that are performing poorly on one SMT processor and move the poor performing thread to another SMT processor. What is a further needed is a system and method that swaps poor performing threads between SMT processors. Finally, what is needed is a system and method that determines whether a thread's performance improves after it has been moved to another SMT processor.

SUMMARY

It has been discovered that the aforementioned challenges are addressed using a system and method that identifies a poor performing thread running on one SMT processor and moves it to a different SMT processor. Performance data is recorded for software threads running on the computer system. In one embodiment, the performance data includes each threads' cycles-per-instruction (CPI) which is determined by dividing the number of cycles that occurred in the processor by the number of instructions that were executed. The lower the CPI value, the better the thread is performing and, conversely, the higher the CPI value the worse the thread is performing. In one embodiment the performance is averaged over a plurality of executions.

A poor performing thread (i.e., one with a high CPI value) is moved from a first run queue to a second run queue, with the first run queue corresponding to its current SMT processor and the second run queue corresponding to a different SMT processor. In one embodiment, poor performing threads are swapped between processors. In this manner, a thread that may perform poorly on one processor may perform adequately on a second processor. One reason that the performance may be improved is that the other threads running on the newly assigned processor may not need the same processor-based resources as the moved thread. With less contention for the processor-based resources, the thread's performance is improved in the SMT processor environment.

When a thread completes execution (i.e., is preempted, time sliced, etc.), the thread's CPI during the last execution is recorded and checked. If the thread is performing worst than a given threshold, a check is made to see whether the thread has previously been moved and, if it has been moved, whether its performance has improved as a result of being moved. If the thread's performance is worse after being moved or if the thread has not recently been moved then the thread is identified as a potential thread to be moved. In one embodiment, one thread from each SMT processor's run queue is identified as poor performing and moved to a different run queue. When a thread is moved, a data structure is updated capturing performance data regarding the thread and a timestamp in order to subsequently determine whether the thread's performance is improving. With systems with more than two SMT processors, poor performing threads can be moved from one processor to the next in a variety of fashions. For example, a round-robin implementation can be used to swap poor performing threads, or processors can be paired with one another with the poor performing threads swapped between the paired processors.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
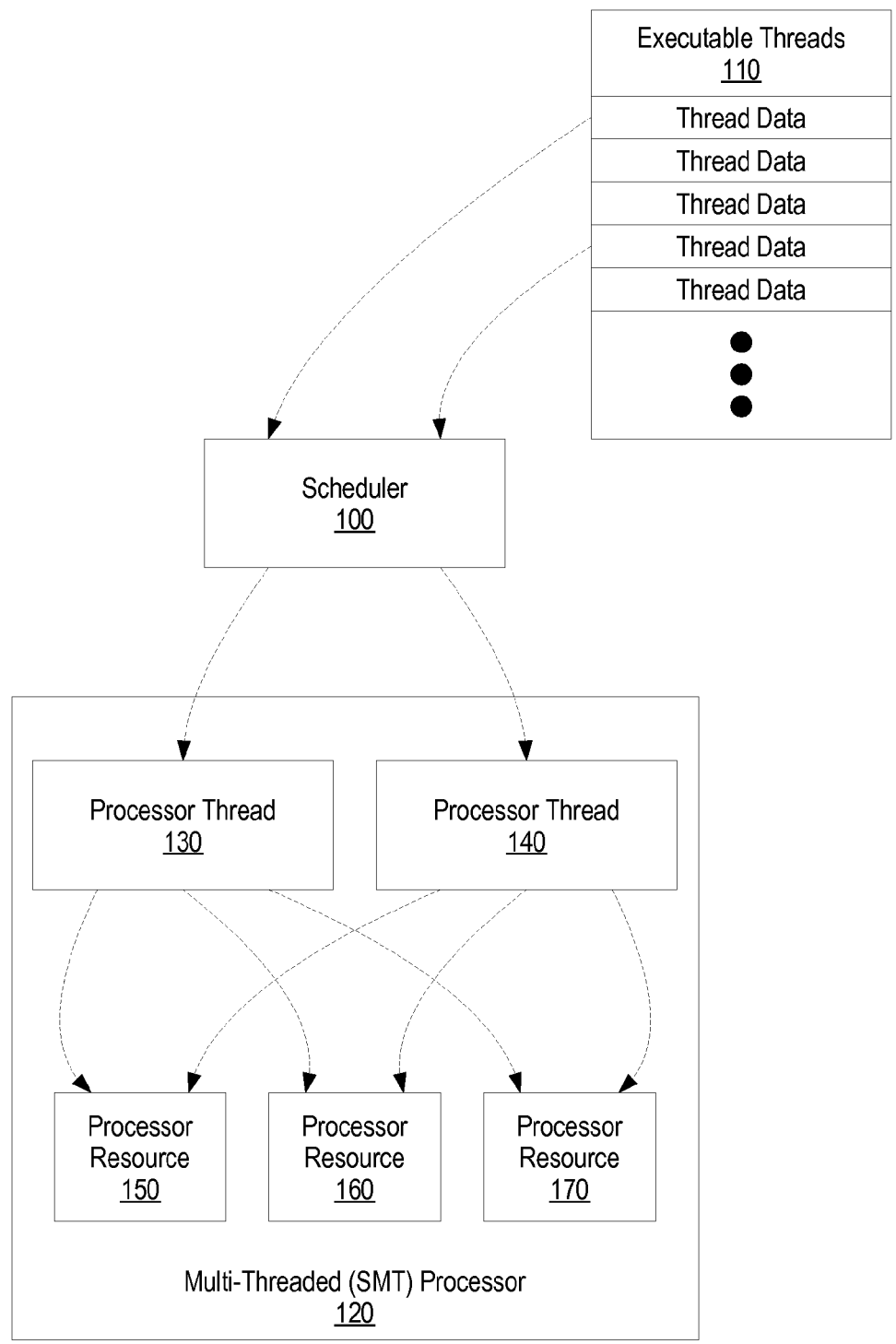
FIG. 1 is a high level diagram of a plurality of threads being scheduled for concurrent execution on an SMT processor.

FIG. 1 is a high level diagram of a plurality of threads being scheduled for concurrent execution on an SMT processor. Scheduler 100 reads thread data corresponding to a plurality of threads 110. In one embodiment, the tread data is stored in a thread control block (TCB) that is used by the system to maintain and manage the threads currently in existence.

Scheduler 100 dispatches threads to execute on processor 120 that supports simultaneous multithreading. Simultaneous multithreading (SMT) is a technique that permits multiple independent threads to issue multiple instructions each cycle to a superscalar processor's functional units. SMT combines the multiple-instruction features of modern superscalar processors with the latency-hiding ability of multithreaded architectures. Unlike conventional multithreaded architectures, which depend on fast context switching to share processor execution resources, all hardware contexts in an SMT processor are active simultaneously, competing each cycle for all available resources. This dynamic sharing of the functional units allows simultaneous multithreading to substantially increase throughput, attacking the two major impediments to processor utilization long latencies and limited per-thread parallelism.

Processor threads 130 and 140 represent two threads that are executing simultaneously on processor 120 and competing for processor resources 150, 160, and 170. Depending on the tasks being performed, executable threads 110 each have different needs for the processor resources. For example, some threads may be data intensive, needing extensive access to the processor's "load/store" resource, while other threads may be computationally intensive and require extensive access to the processor's "adder" resource or floating-point resource.

Because the resources are shared amongst the threads that are currently executing, if each thread needs to perform the same function, one of the threads will have to wait while the other thread receives access to the function. If contention for resources is high between processes, then the processes will take more time to complete than if contention is lower.

Data is maintained for each executable thread indicating each thread's compatibility with other threads. For example, if two threads run well together (i.e., each have a low Cycles Per Instruction when running together), this information will be used by the scheduler to preferably have both of these threads run at the same time.

Figure 2:
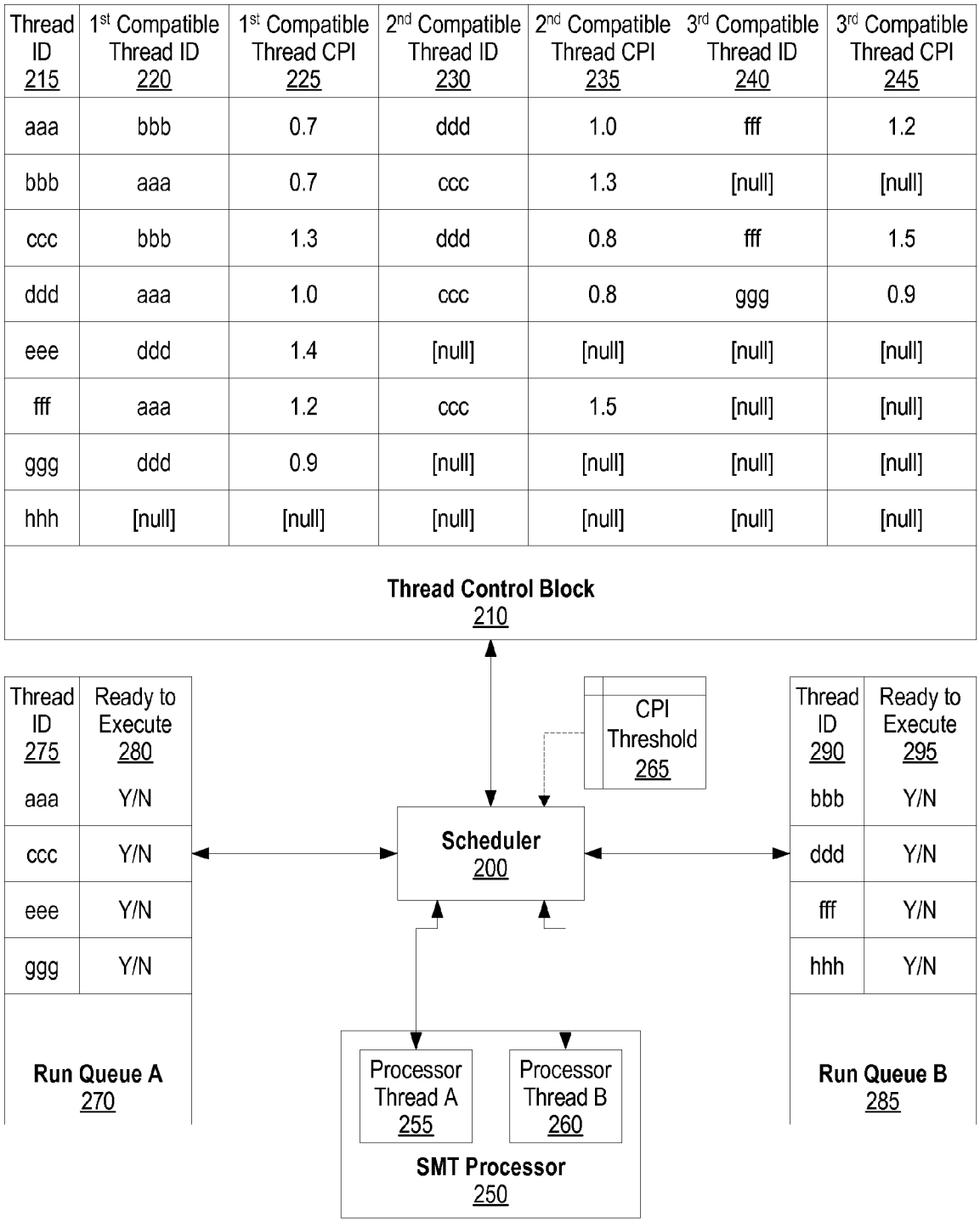
FIG. 2 is a diagram showing the scheduler using thread measurement data and run queue data to schedule threads on an SMT processor.

FIG. 2 is a diagram showing the scheduler using thread measurement data and run queue data to schedule threads on an SMT processor. When a thread completes execution on SMT processor 250, scheduler 200 dispatches the next thread for execution. If a thread from Run Queue A (270) completes, then another thread from Run Queue A is dispatched. Likewise, if a thread from Run Queue B (285) completes, then the scheduler dispatches another thread that is ready to execute from Run Queue B.

In order to determine which thread to dispatch, scheduler 200 determines which thread is currently running on the other processor thread. For example, if the thread that is ending is from Run Queue B, then the thread identifier corresponding to the thread that is currently running in Processor Thread A (255) is retrieved. Likewise, if the thread that is ending is from Run Queue A, then the thread identifier corresponding to the thread that is currently running in Processor Thread B (260) is retrieved. Run queues include data regarding the identifier of the thread (identifier 275 for threads in Run Queue A and identifier 290 for threads in Run Queue B) as well as data indicating whether the thread is ready to execute (indicator 280 for threads in Run Queue A and indicator 295 for threads in Run Queue B).

The scheduler then determines if any "compatible" threads are ready to execute. For example, if threads "aaa" from Run Queue A is running with thread "bbb" from Run Queue B and thread "bbb" is ending, then the scheduler determines if any threads that are compatible with thread "aaa" are ready to run. In one embodiment, the scheduler reads the compatibility information for thread "aaa" from its entry in thread control block 210. Thread control block 210 includes a number of data fields for each thread. This data includes the identifier of the thread 215, fields for up to three identifiers corresponding to compatible threads (identifiers 220, 235, and 245), and the Cycles Per Instruction (CPI) that were achieved when the compatible threads were running with the compatible threads (CPI 225 corresponding to thread ID 220, CPI 235 corresponding to thread ID 230, and CPI 245 corresponding to thread ID 240). In one embodiment, the CPI stored in fields 225, 235, and 245 is the last CPI that occurred during the last execution of the thread with the compatible thread. In another embodiment, an average CPI is maintained for the various threads and the average CPI that has occurred during executions of the thread with the compatible thread are stored in the CPI fields.

In the example shown, thread "aaa" is most compatible with thread "bbb" as it has the lowest CPI (0.7) when running with thread "bbb." Thread "aaa" is also compatible with threads "ddd" (CPI of 1.0) and "fff" (CPI of 1.2). The scheduler determines whether thread "ddd" is ready to execute and, if so, dispatches the thread from Run Queue B to SMT Processor 250 in the processor's "B" thread space (260). If thread "ddd" is not ready to execute, then the scheduler determines whether thread "fff" is ready to execute, and if so the scheduler dispatches it. If neither threads "ddd" or "fff" are ready to execute, the next thread that is ready to run from Run Queue B is selected and dispatched by the scheduler.

In addition, when threads finish running the CPI is updated. Some compatible thread IDs are "[null]" (an empty slot) which indicates that not enough compatible threads have been found to fill all the slots. When a thread finishes execution, the CPI of the thread is captured and compared to a CPI threshold value 265. If the thread's CPI is better than the threshold amount, then the CPI measurement and identifier may be placed into a compatibility slot if (1) an empty slot exists, or (2) no empty slots exist but the newly captured CPI is better than one of the current compatible threads (in which case the newly captured CPI and thread identifier replaces the current compatible thread with the highest, i.e., poorest, CPI).

Figure 3:
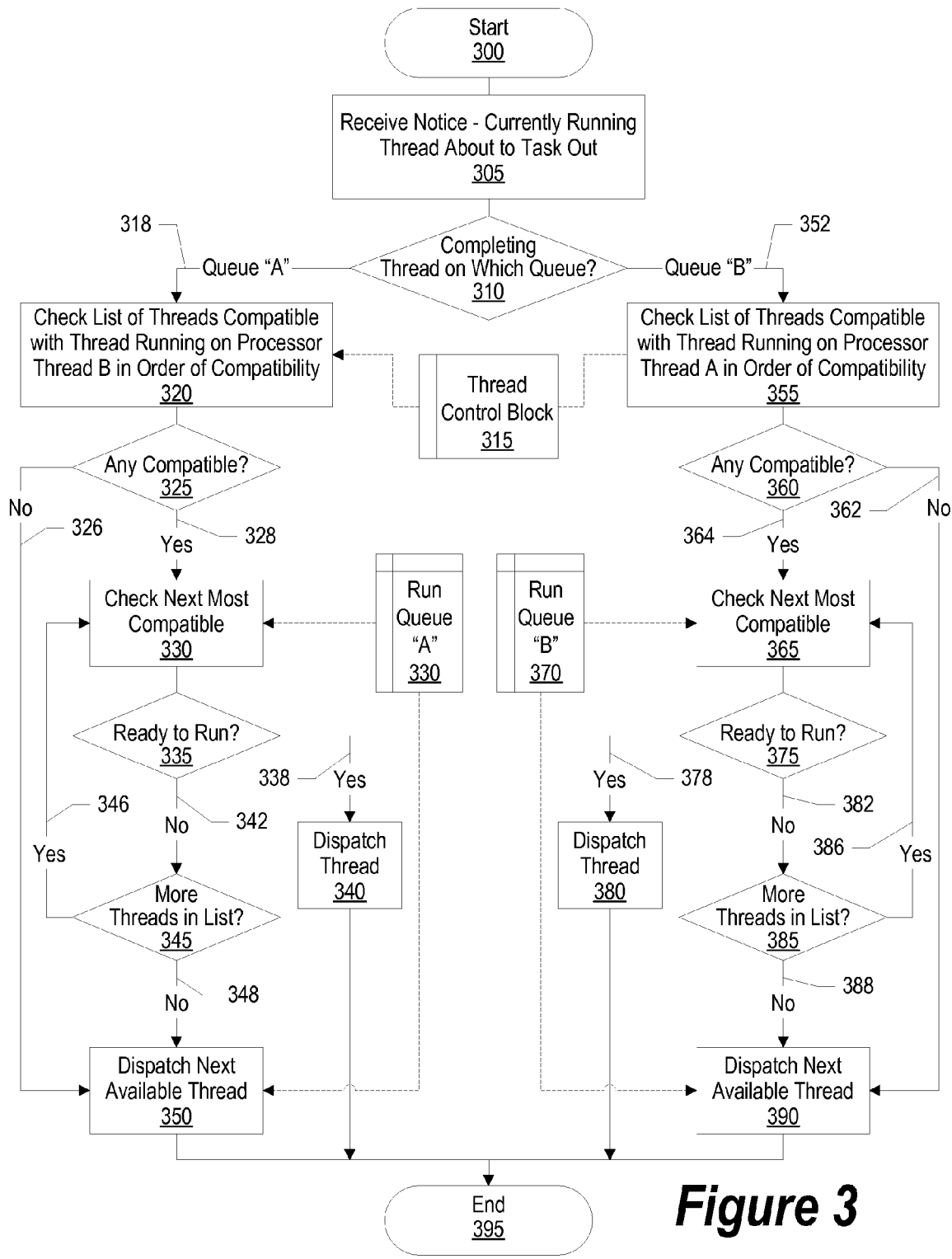
FIG. 3 is a flowchart showing the steps taken by a scheduler in determining a thread to dispatch onto an SMT processor.

FIG. 3 is a flowchart showing the steps taken by a scheduler in determining a thread to dispatch onto an SMT processor. Processing commences at 300 whereupon, at step 305, the scheduler receives a notice that a currently running thread is about to task out.

A determination is made as to which run queue includes the completing thread (decision 310). If the completing thread is on run queue "A", then decision 310 branches to "yes" branch 318 in order to retrieve the next thread to dispatch from run queue "A." At step 320, the compatibility list is checked to determine which threads on run queue "A" are compatible with the thread that is currently executing on processor thread "B" (which receives threads from run queue "B"). This check is made by reading the compatibility data stored in thread control block 315 (for a more detailed example of the data stored in the thread control block, see block 210 in FIG. 2).

A determination is made as to whether there are any compatible threads listed for the thread running on processor thread "B" (decision 325). If there are no compatible threads listed, then decision 325 branches to "no" branch 326 whereupon, at step 350, the next available thread from run queue "A" that is ready to run is dispatched and processing ends at 395.

On the other hand, if one or more threads listed in the thread control block are compatible with the thread currently running on processor thread "B," then decision 325 branches to "yes" branch 328 whereupon, at step 330, the most compatible thread (i.e., the one with the lowest CPI) is checked by reading data from run queue "A" to determine if it is ready to run. A determination is made as to whether the last checked thread is ready to run (decision 335). If the last checked thread is ready to run, decision 335 branches to "yes" branch 338 whereupon, at step 340, the thread is dispatched. On the other hand, if the compatible thread is not ready to run, decision 335 branches to "no" branch 342 whereupon a determination is made as to whether there are any more compatible threads listed in the thread control block (decision 345). If there are more compatible threads listed, decision 345 branches to "yes" branch 346 which loops back to see if this thread is ready to run. This looping continues until either a compatible, ready to run thread is found (decision 335 branching to "yes" branch 338), or there are no more compatible threads to check. If there are no more compatible threads to check, decision 345 branches to "no" branch 348 whereupon, at step 350, the next available (ready to run) thread from run queue "A" is dispatched. Processing thereafter ends at 395.

Returning to decision 310, if the completing thread is on run queue "B,", decision 310 branches to branch 352 whereupon a synonymous set of decisions and steps are performed to determine which thread from run queue "B" should be dispatched. The details of these steps are as follows:

At step 355, the compatibility list is checked to determine which threads on run queue "B" are compatible with the thread that is currently executing on processor thread "A" (which receives threads from run queue "A"). This check is made by reading the compatibility data stored in thread control block 315.

A determination is made as to whether there are any compatible threads listed for the thread running on processor thread "A" (decision 360). If there are no compatible threads listed, then decision 360 branches to "no" branch 362 whereupon, at step 390, the next available thread from run queue "B" that is ready to run is dispatched and processing ends at 395.

On the other hand, if one or more threads listed in the thread control block are compatible with the thread currently running on processor thread "A," then decision 360 branches to "yes" branch 364 whereupon, at step 365, the most compatible thread (i.e., the one with the lowest CPI) is checked by reading data from run queue "B" to determine if it is ready to run. A determination is made as to whether the last checked thread is ready to run (decision 375). If the last checked thread is ready to run, decision 375 branches to "yes" branch 378 whereupon, at step 380, the thread is dispatched. On the other hand, if the compatible thread is not ready to run, decision 375 branches to "no" branch 382 whereupon a determination is made as to whether there are any more compatible threads listed in the thread control block (decision 385). If there are more compatible threads listed, decision 385 branches to "yes" branch 386 which loops back to see if this thread is ready to run. This looping continues until either a compatible, ready to run thread is found (decision 375 branching to "yes" branch 378), or there are no more compatible threads to check. If there are no more compatible threads to check, decision 385 branches to "no" branch 388 whereupon, at step 390, the next available (ready to run) thread from run queue "B" is dispatched. Processing thereafter ends at 395.

Figure 4:
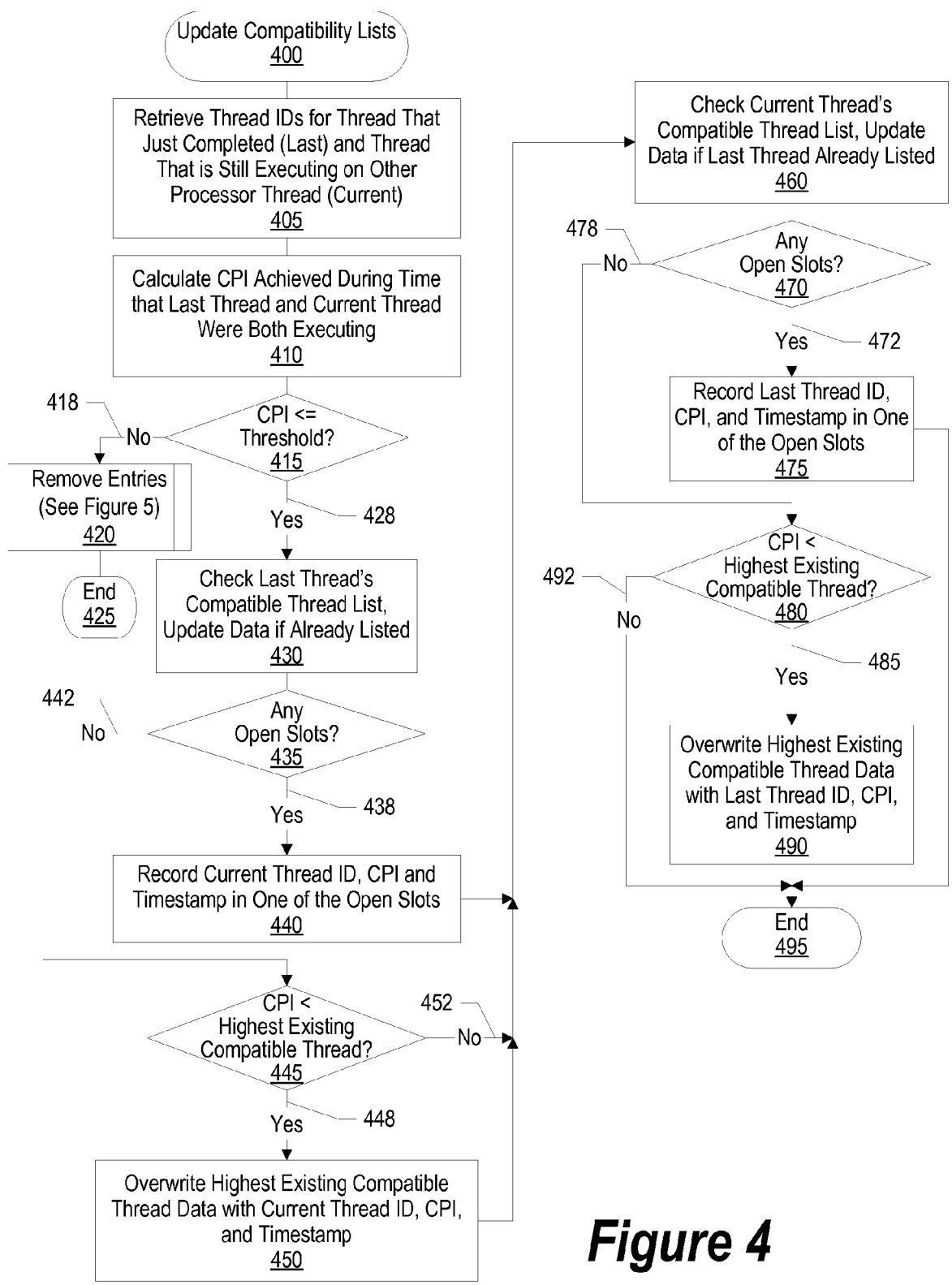
FIG. 4 is a flowchart showing the steps taken to update a thread's compatibility list.

FIG. 4 is a flowchart showing the steps taken to update a thread's compatibility list. Processing commences at 400 whereupon, at step 405, the thread identifier for the thread that just completed executing on one of the processor threads is retrieved along with the thread identifier for the thread that is still executing on the other processor thread. Next, at step 410, the CPI that was achieved during the time that the thread that just completed and the thread that is still executing is retrieved.

A determination is made as to whether the retrieved CPI is less than or equal to (i.e., better than) the compatibility threshold that was established (decision 415). If the CPI is greater than the threshold value, then the threads are not considered to be "compatible." The threshold value is a tunable value. The higher the value, the more threads will be considered "compatible" yet, because of the higher value, the CPIs will not necessarily greatly improve overall system performance. On the other hand, lowering the threshold value more likely ensures that "compatible" threads, when available, will perform well together, yet because of the lower threshold value fewer compatible threads may be identified. Thus, tuning the compatibility threshold may be necessary depending upon the type of processing being performed by a given computer system.

If the CPI is greater than the threshold value, decision 415 branches to "no" branch 418 whereupon the threads are judged as being "not compatible" and any entries indicating that the threads are compatible are removed (predefined process 420, see FIG. 5 for processing details), and processing ends at 425.

On the other hand, if the CPI is less than or equal to the threshold value, decision 415 branches to "yes" branch 428 whereupon, at step 430, the compatibility list for the thread that just completed is checked. If the thread that is currently running is already in the compatibility list, then the CPI for the thread is updated during step 430. In one embodiment, the thread table keeps track of the last CPI, in which case the latest CPI is inserted into the thread table in the field that corresponds to the identifier of the currently running thread. In another embodiment, the thread table keeps an average CPI value, in which case the newest CPI value is averaged in with the other values that were achieved when the thread that just completed runs with the currently running thread. In addition, during step 430 a timestamp is recorded to track the last time that the two threads ran together.

In the case where the currently running thread is not listed in the last thread's compatibility list, a determination is made as to whether there are any open slots (i.e., fields) in the compatibility list (decision 435). If there is at least one open (i.e., currently unused) field, decision 435 branches to "yes" branch 438 whereupon, at step 440, the thread identifier of the currently running thread is recorded along with the CPI value and a timestamp.

On the other hand, if there are no open slots in the compatibility list for the thread that just completed, decision 435 branches to "no" branch 442 which bypasses step 440 and performs another determination as to whether the CPI that was achieved between the two threads is better than (i.e., less than) the CPI of the poorest (i.e., highest) CPI currently listed in the compatibility list (decision 445). If the CPI achieved for the two threads is better than one of the CPIs currently listed in the compatibility list, decision 445 branches to "yes" branch 448 whereupon, at step 450, the thread identifier corresponding to the highest listed compatible CPI is overwritten with the thread identifier of the currently running thread, the CPI value that was in the compatibility list is overwritten with the CPI that was just achieved, and the former timestamp is overwritten with an updated timestamp reflecting the time at which the CPI was achieved between the two threads.

If the CPI is not better than the poorest listed CPI in the thread table, the compatibility list entries corresponding to the thread identifier of the thread that just completed are left intact (i.e., not changed) and decision 445 branches to "no" branch 452.

Similarly to steps 430 through 450 described above to update the compatibility list for the thread that just completed executing, the same steps are performed to update the compatibility list for the currently running thread. At step 460 the compatibility list corresponding to the thread identifier that is currently running is checked and, if the thread identifier of the thread that just completed is already listed, the data corresponding to the just completed thread is updated (i.e., the CPI and timestamp are updated). Again, in one embodiment the last CPI is tracked while in another embodiment an average CPI is calculated and recorded.

In the case where the thread that just completed running is not listed in the currently running thread's compatibility list, a determination is made as to whether there are any open slots in the compatibility list (decision 470). If there is at least one open (i.e., currently unused) field, decision 470 branches to "yes" branch 472 whereupon, at step 474, the thread identifier of the currently running thread is recorded along with the CPI value and a timestamp.

On the other hand, if there are no open slots in the compatibility list for the currently running thread, decision 470 branches to "no" branch 478 which bypasses step 475 and performs another determination as to whether the CPI that was achieved between the two threads is better than (i.e., less than) the CPI of the poorest (i.e., highest) CPI currently listed in the compatibility list (decision 480). If the CPI achieved for the two threads is better than one of the CPIs currently listed in the compatibility list, decision 480 branches to "yes" branch 485 whereupon, at step 490, the thread identifier corresponding to the highest listed compatible CPI is overwritten with the thread identifier of the thread that just completed executing, the CPI value that was in the compatibility list is overwritten with the CPI that was just achieved, and the former timestamp is overwritten with an updated timestamp reflecting the time at which the CPI was achieved between the two threads.

If the CPI is not better than the poorest listed CPI in the thread table, the compatibility list entries corresponding to the thread identifier of the thread that just completed are left intact (i.e., not changed) with decision 480 branching to "no" branch 492 bypassing step 490.

Processing performed to update the threads' compatibility lists thereafter ends at 495.

Figure 5:
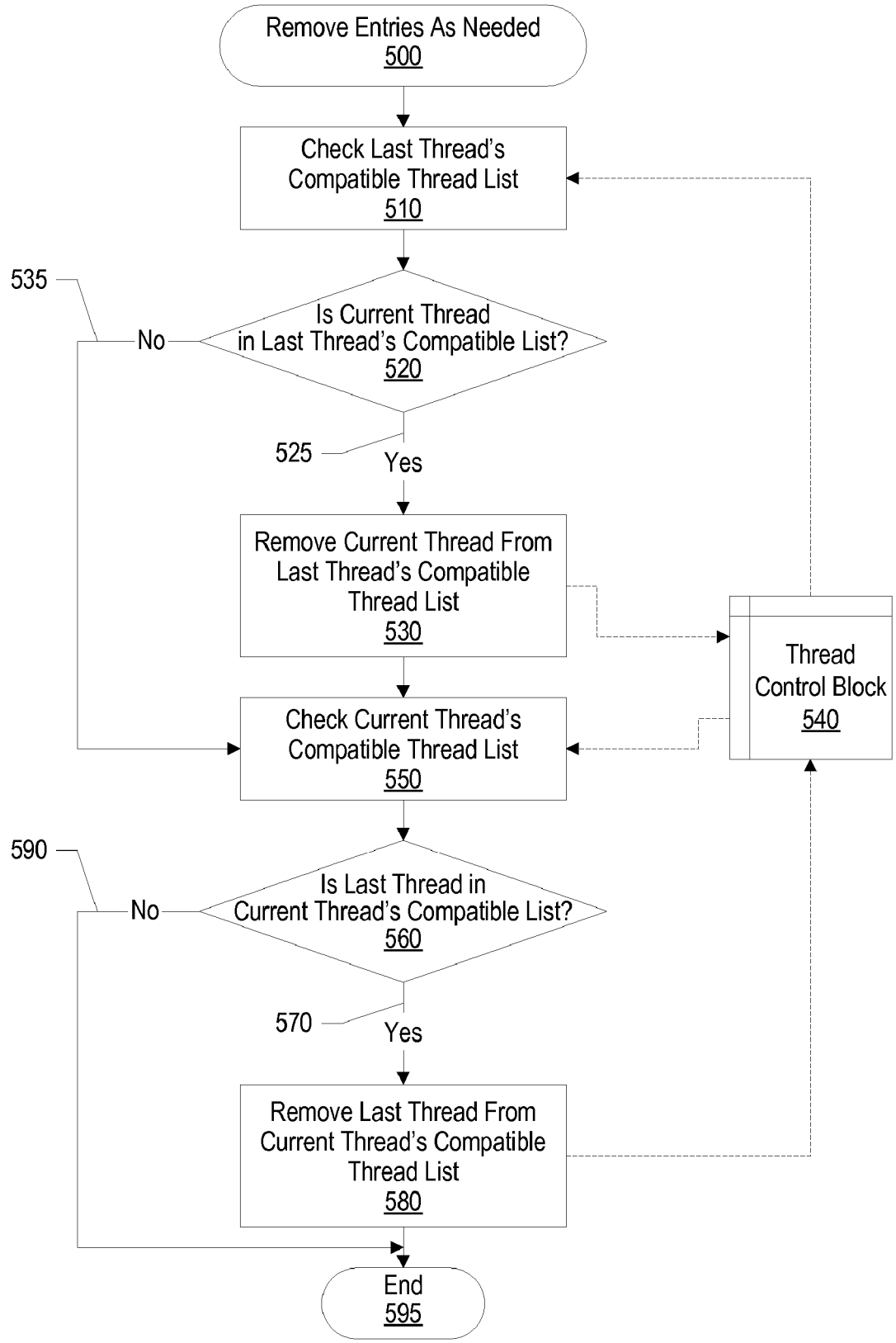
FIG. 5 is a flowchart showing the steps taken to remove entries from a thread's compatibility list.

FIG. 5 is a flowchart showing the steps taken to remove entries from a thread's compatibility list. This procedure is called when the CPI achieved when two threads were executing at the same time on an SMT processor was worse than (i.e., higher than) a threshold set for the system (see FIG. 4, predefined process 420, that calls the processing shown in FIG. 5).

FIG. 5 processing commences at 500 whereupon, at step 510, the compatibility list corresponding to the thread that just completed executing is read in order to determine whether the thread identifier for the currently executing thread is listed as being a compatible thread. In one embodiment, the compatibility list is stored in thread control block 540. A determination is made as to whether the identifier of the currently running thread is listed in the last thread's compatibility list (decision 520). If the current thread is listed in the last thread's compatibility list, decision 520 branches to "yes" branch 525 whereupon, at step 530, data regarding the currently running thread is removed from the compatibility list. In one embodiment, the compatibility list data is stored in thread control block 540. On the other hand, if data pertaining to the currently running thread is not listed in the compatibility list of the thread that just completed, decision 520 branches to "no" branch 535 bypassing step 530.

At step 550, the compatibility list corresponding to the currently running thread is read in order to determine whether the thread identifier of the thread that just completed executing is listed as being a compatible thread. A determination is made as to whether the thread identifier of the thread that just completed executing is listed in the currently running thread's compatibility list (decision 560). If the thread identifier of the thread that just completed executing is listed in the currently running thread's compatibility list, decision 560 branches to "yes" branch 570 whereupon, at step 580, data regarding the thread that just completed executing is removed from the compatibility list. On the other hand, if data pertaining to the thread that just completed executing is not listed in the compatibility list of the currently running thread, decision 560 branches to "no" branch 590 bypassing step 580. Processing thereafter ends at 595.

Figure 6:
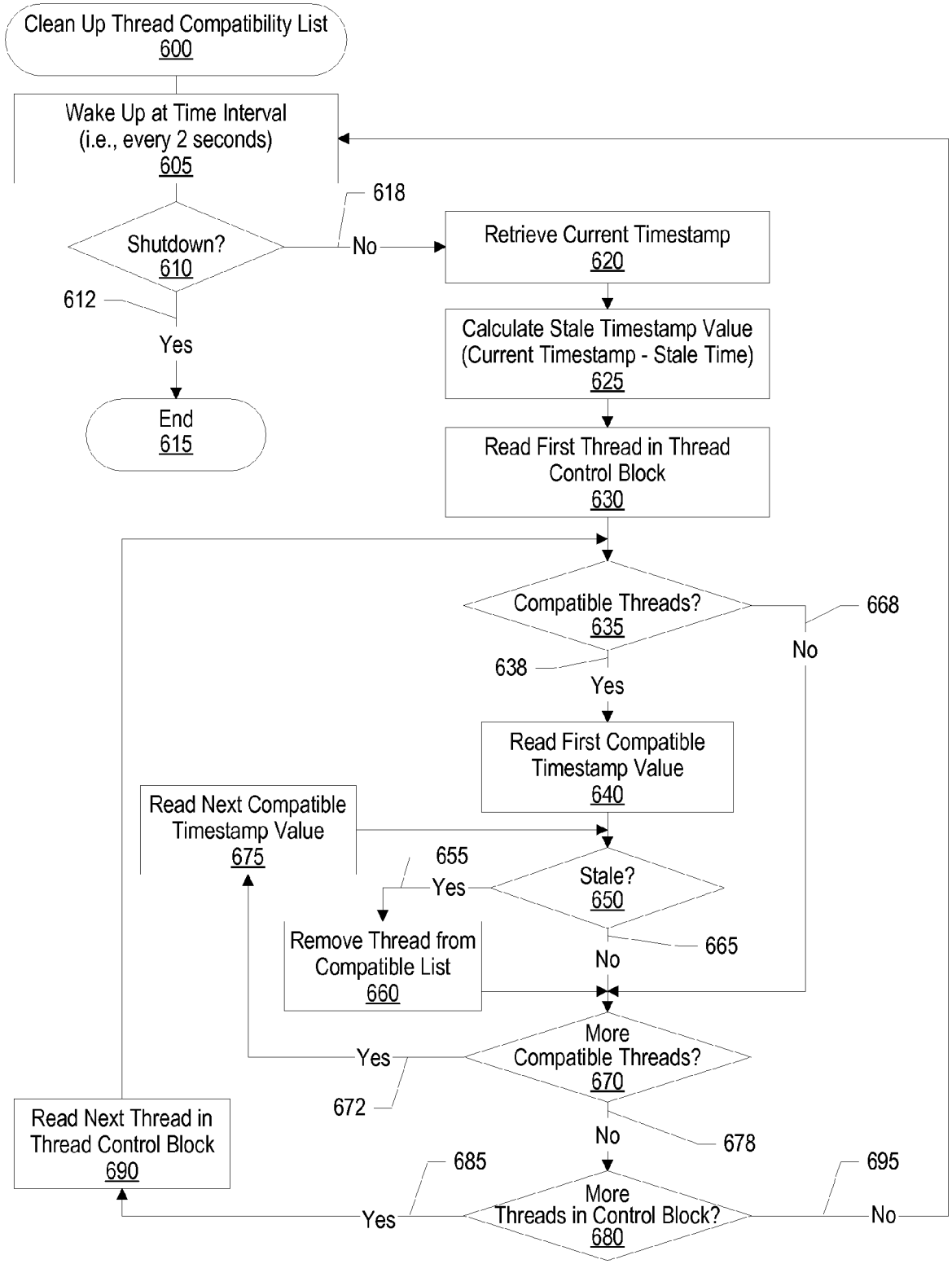
FIG. 6 is a flowchart showing the steps taken to periodically clean up the compatibility lists found in the thread control block.

FIG. 6 is a flowchart showing the steps taken to periodically clean up the compatibility lists found in the thread control block. Processing commences at 600 whereupon, at step 605, processing wakes up at periodic intervals, for example every two seconds.

Processing continues until the system is shutdown. Consequently, a determination is made as to whether the system is being shutdown (decision 610). When the system is being shutdown, decision 610 branches to "yes" branch 612 whereupon processing ends at 615.

On the other hand, if the system is not being shutdown, decision 610 branches to "no" branch 618 to perform the thread clean up operations. At step 620 processing retrieves the current system time (timestamp). A stale timestamp value is calculated based upon the current time by subtracting a stale time from the timestamp value (step 625). For example, an otherwise compatible thread that has not had its timestamp value updated in the past two seconds may be considered "stale" and, therefore, no longer considered compatible with the thread. The reason may be because the other thread has terminated, the other thread has been put to sleep waiting on another event to occur, or some other reason that the other thread has not been scheduled to run along with an otherwise compatible thread.

At step 630, the first thread in the thread control block is read. A determination is made as to whether the thread control block data includes compatible thread information (decision 635). If the entry for the thread includes compatible thread information, decision 635 branches to "yes" branch 638 whereupon, at step 640, the timestamp corresponding to the first listed compatible thread is read. A determination is made, by comparing the timestamp to the calculated stale timestamp value, as to whether the thread listed in the compatibility list is stale and should be removed from the list (decision 650). If the thread listed in the compatibility list is stale, decision 650 branches to "yes" branch 655 whereupon, at step 660, the stale thread is removed from the compatible thread list. On the other hand, if the timestamp for the compatible thread is within acceptable parameters (i.e., the thread is not stale), then decision 650 branches to "no" branch 665 and the thread is kept in the compatible thread list.

A determination is made as to whether there are more threads listed in the compatible thread list that need to be processed (decision 670). If there are more threads listed, decision 670 branches to "yes" branch 672 whereupon, at step 675, the timestamp for the next thread in the compatible thread list is read and processing loops back to determine whether the thread is stale and should be removed from the compatible thread list. This looping continues until there are no more compatible threads listed for the thread read from the thread control block, at which point decision 670 branches to "no" branch 678.

A determination is made as to whether there are more threads listed in the thread control block that need to be processed and have their compatibility lists cleaned up (decision 680). If there are more threads in the control block, decision 680 branches to "yes" branch 685 whereupon, at step 690, the data for the next thread in the thread control block is read and processing loops back to clean up any stale threads listed in that thread's compatibility list.

This looping continues until all threads in the thread control block have been read, at which point decision 680 branches to "no" branch 695 which loops back to step 605, causing processing to wait for the time interval to elapse before performing the clean up processing once again. Clean up processing continues until the system is shutdown, at which point decision 610 branches to "yes" branch 612 and processing ends at 615.

Figure 7:
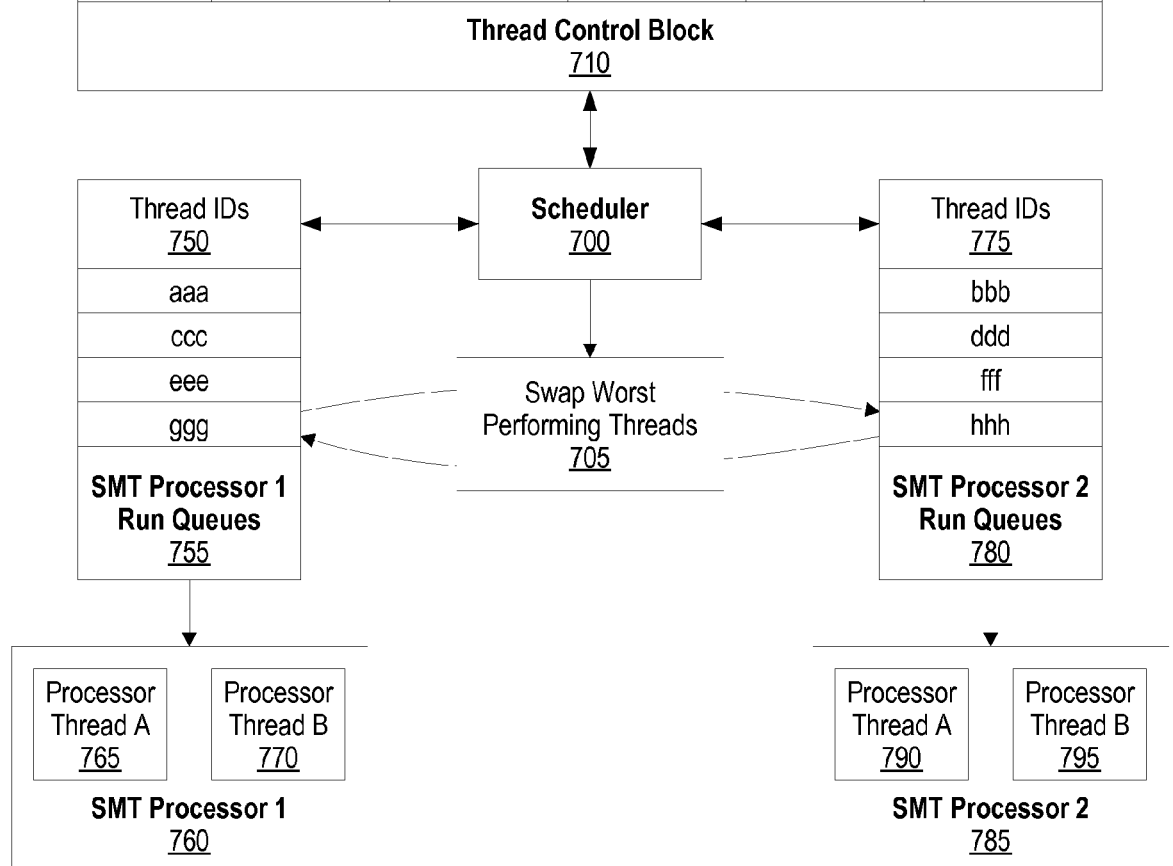
FIG. 7 is a diagram showing the scheduler swapping a poor performing thread from one SMT processor to another SMT processor in order to improve overall system performance.

FIG. 7 is a diagram showing the scheduler swapping a poor performing thread from one SMT processor to another SMT processor in order to improve overall system performance. Scheduler 700 reads data pertaining to threads that has been stored in thread control block 710 in order to determine which threads should be swapped between processors in a system with multiple SMT processors.

The CPI data stored in the thread control block is used by the scheduler to identify poor performing threads from data gathered during the threads' previous executions. In the embodiment shown in FIG. 7, two SMT processors are shown (760 and 785) each having two processor threads for executing two execution threads at the same time (processor threads 765 and 770 corresponding to SMT processor 760 and processor threads 790 and 795 corresponding to SMT processor 785). Each of the SMT processors have a run queue (run queue 755 corresponding to SMT processor 760 and run queue 780 corresponding to SMT processor 785). The run queues identify the threads that are scheduled to run on the processors. In the example shown, threads "aaa," "ccc," "eee," and "ggg" are listed in run queue 755 and, therefore, execute on SMT processor 760. Likewise, threads "bbb," "ddd," "fff," and "hhh" are listed in run queue 780 and therefore execute on SMT processor 785.

Scheduler 700 determines which threads from the various run queues are the poorest performing threads. Once the poor performing threads have been identified, process 705 within scheduler 700 swaps the threads from one run queue to the other. In the example shown, thread "ggg" is the poorest performing thread listed in run queue 755 while thread "hhh" is the poorest performing thread listed in run queue 780. When process 705 is performed, thread "ggg" will be placed in run queue 780 and thread "hhh" will be placed in run queue 755.

Because threads share processor resources in the SMT environment, swapping threads from one run queue to another puts the swapped thread in a pool of different threads with differing processor resources. The goal, therefore, of swapping threads is to find a more efficient environment for poor performing threads reducing contention for processor resources, thus improving thread efficiency. In addition, the swapping techniques shown in FIGS. 7-11 can be used in conjunction with the SMT scheduling techniques shown in FIGS. 1-6 so that threads within a run queue are scheduled with more compatible threads within the same run queue.

Figure 8:
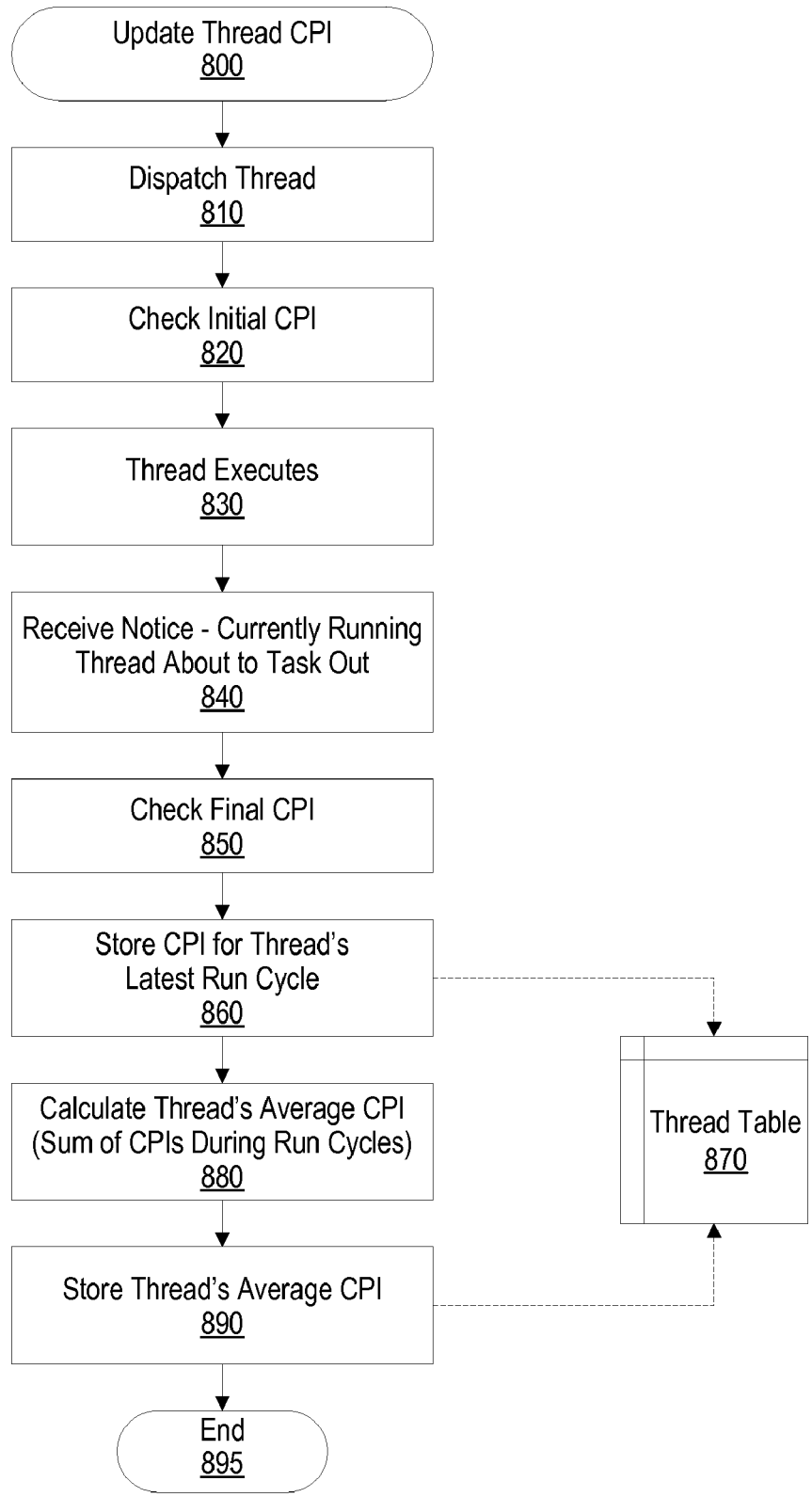
FIG. 8 is a flowchart showing the steps taken to update a thread's CPI.

FIG. 8 is a flowchart showing the steps taken to update a thread's CPI. Processing commences at 800 whereupon, at step 810, a thread is dispatched by the scheduler to one of the processor threads that are included with the SMT processor. At step 820, an initial CPI value is retrieved from the processor. In one embodiment, the processor records the number of cycles that were performed as well as the number of instructions that were executed. CPI is then computed as the number of cycles divided by the number of executed instructions. The thread executes, at step 830, for some amount of time until the thread finishes its processing or is tasked out (i.e., timed out). When the thread is about to finish executing, a notice is received, at step 840, informing the process that the thread is about to finish processing. If the processing shown in FIG. 8 is being performed by the scheduler, then the process would determine that the thread is about to finish because the scheduler determines when threads are dispatched and tasked out. On the other hand, if the processing shown in FIG. 8 is performed by a process separate from the scheduler, then the scheduler sends the process a signal when the thread is about to finish executing.

At step 850, the final CPI for the thread that just completed executing is retrieved. The CPI value is determined for the threads latest run cycle by computing the number of cycles that transpired while the thread was executing as well as the number of instructions that were performed while during the thread's execution. [IS THIS THE NUMBER OF INSTRUCTIONS THAT THIS THREAD COMPLETED, OR IS THIS THE NUMBER OF INSTRUCTIONS, OVERALL, THAT THE SMT PROCESSOR WAS ABLE TO COMPLETE?] The thread's latest CPI is stored, at step 860, in thread table 870 (i.e., the thread control block). At step 880, the thread's average CPI is computed by averaging the CPI values stored in the thread table for this thread. The thread's average CPI is then stored, at step 890, in thread table 870.

The processing shown in FIG. 8 is performed for each thread that is dispatched by the scheduler. For illustrative purposes, FIG. 8 shows the CPI tracking that is performed for a single thread. Because SMT processors operate on multiple threads simultaneously, the processing shown in FIG. 8 will be invoked multiple times in order to keep track of the various processor threads. For example, if the SMT processor processes two processor threads simultaneously, then the processing shown in FIG. 8 would either be executed twice (once for each thread) or modified to track the CPIs of both threads.

Figure 9:
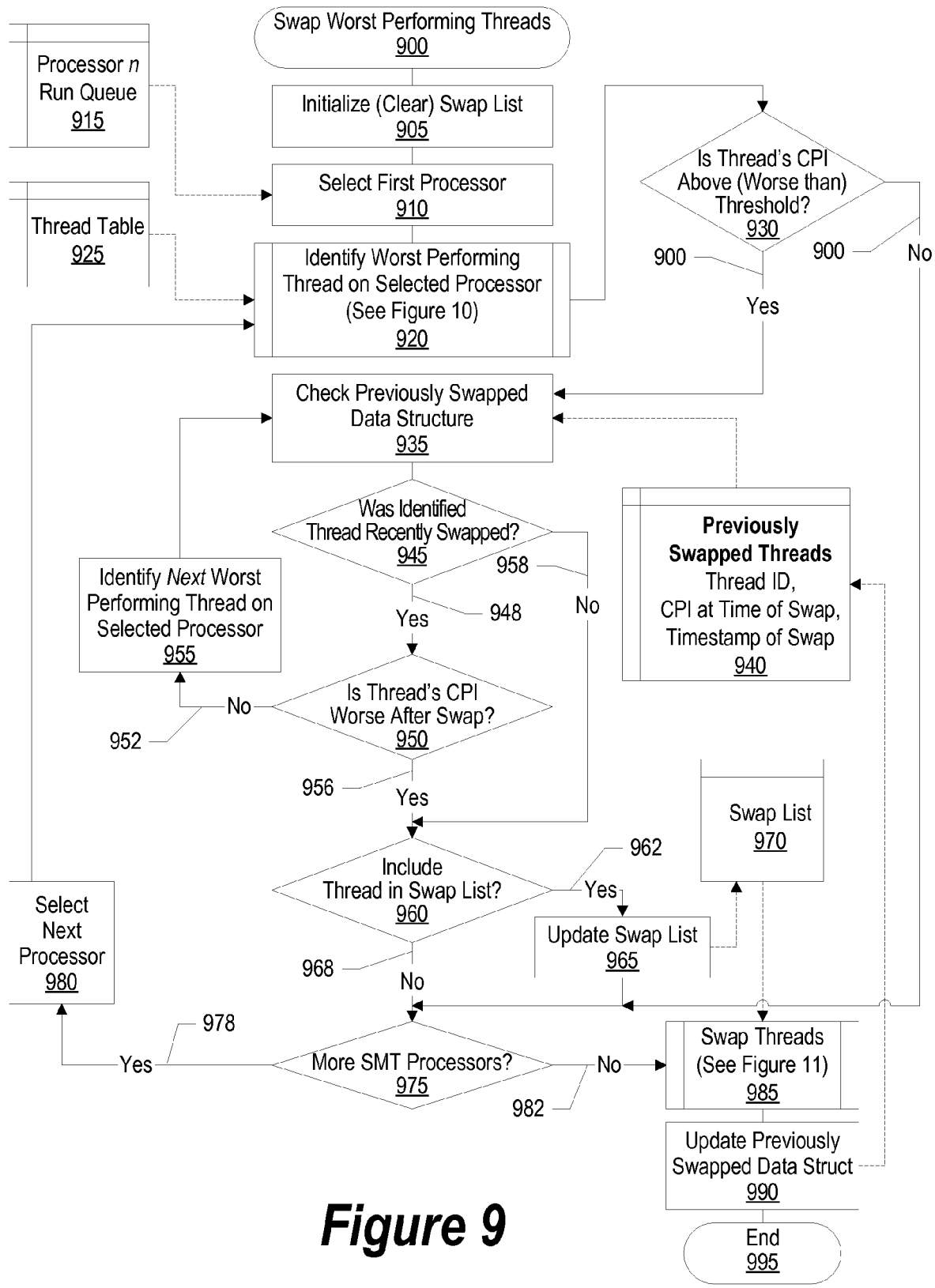
FIG. 9 is a flowchart showing the steps taken to swap poor performing threads between SMT processors.

FIG. 9 is a flowchart showing the steps taken to swap poor performing threads between SMT processors. Processing commences at 900 whereupon, at step 905 the swap list (970) is initialized (i.e., cleared). Run queue 915 corresponding to the first processor is selected at 910. At step 920, the worst performing thread from the first run queue is identified by searching through thread table 925 for the thread in the selected run queue with the worst (i.e., highest) CPI.

A determination is made as to whether the CPI of the worst performing thread is above (i.e., worse than) a predetermined threshold (decision 930). This determination is made to ensure that only poor performing threads are swapped, otherwise additional resources are being taken to swap threads with adequate performance. If the thread's CPI is not worse than the threshold, decision 930 branches to "no" branch 932 which bypasses steps taken to write the thread's data into a swap list for swapping between the SMT run queues. On the other hand, if the thread's CPI is worse than the threshold, decision 930 branches to "yes" branch 934 whereupon, at step 935, previously swapped threads list 940 is read to see if the worst performing thread was recently swapped. Previously swapped thread list includes data about threads that have been swapped. This data includes the identifiers of the swapped threads, the CPI of the threads at the time the threads were swapped, and timestamps indicating the time at which each of the threads were last swapped.

A determination is made as to whether the worst performing thread was previously swapped, as indicated by the thread's identifier being found in the previously swapped list (decision 945). If the thread was previously swapped, then decision 945 branches to "yes" branch 948 whereupon a determination is made as to whether the thread's CPI is worse after the swap or was worse before the swap (decision 950). If the thread's CPI has improved (i.e., is not worse) after it was swapped, then decision 950 branches to "no" branch 952 whereupon, at step 955, the next worst performing thread from the selected processor run queue is identified, and processing loops back to determine whether this thread was previously swapped and whether the thread's performance has improved or degraded following the swap. Returning to decision 950, if the selected thread's CPI is worse after being swapped, decision 950 branches to "yes" branch 956.

A determination is made as to whether to include the identified thread in the swap list (decision 965). This decision can be based on a variety of factors, such as whether the thread's CPI is worse than a given threshold and, if the thread was previously swapped, how long ago the swap occurred. It may be decided to not swap threads that have been swapped very recently to avoid swapping the same threads back and forth amongst the processor run queues. If the thread is to be included in the swap list, decision 960 branches to "yes" branch 962 whereupon, at step 965, swap list 970 is updated by writing the thread's identifier into the list. On the other hand, if the thread is not to be included in the swap list, decision 960 branches to "no" branch 968 bypassing step 965.

A determination is made as to whether there are additional SMT processors from which to identify poor performing threads (decision 975). In order to swap threads amongst processors, at least two SMT processors would be present in the computer system, so decision 975 would branch to "yes" branch 978 at least once.

If there are more SMT processors to process, decision 975 branches to "yes" branch 978 whereupon, at step 980, the next processor in the multiprocessor system is selected and processing loops back to identify a poor performing thread from the selected SMT processor. This looping continues until all SMT processors have been processed, at which point decision 975 branches to "no" branch 982 whereupon the threads in the swap list are swapped between processors (predefined process 985, see FIG. 11 and corresponding text for processing details). At step 990, previously swapped threads list 940 is updated to record the thread identifiers, latest CPI, and timestamps of the threads that are swapped. In addition, if more than two SMT processors are included in the system, then the previously swapped thread list also tracks the processor from which the thread was taken. Processing thereafter ends at 995.

Figure 10:
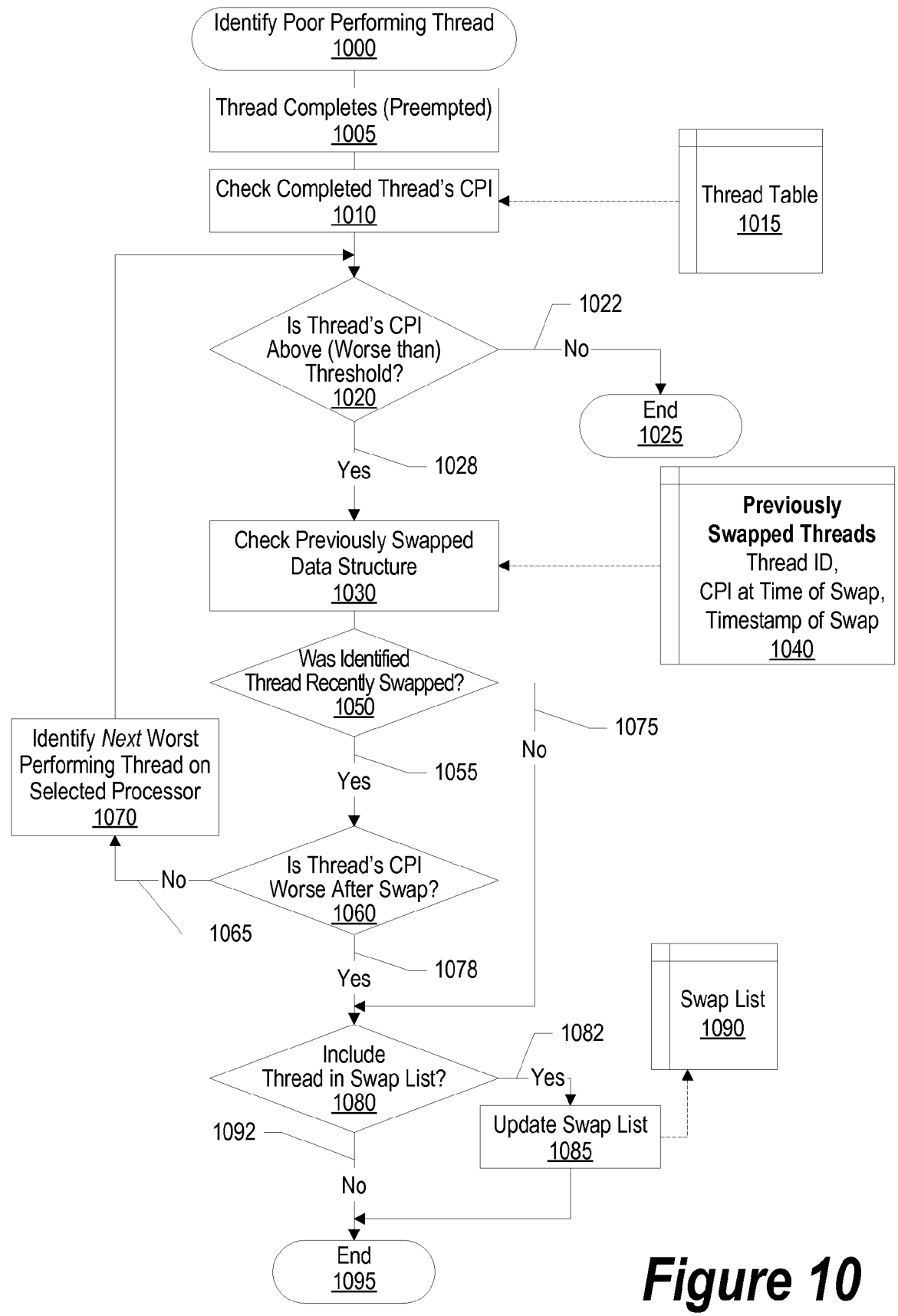
FIG. 10 is a flowchart showing the steps taken to identify poor performing threads to swap in a multiple SMT processor system.

FIG. 10 is a flowchart showing the steps taken to identify poor performing threads to swap in a multiple SMT processor system. Processing commences at 1000 whereupon, at step 1005, one of the threads running on one of the SMT processors completes (i.e., is preempted, time sliced, etc.). At step 1010 the recently-completed thread's CPI is read from thread table 1015 that includes CPI related information about the threads that are currently running.

A determination is made as to whether the recently-completed thread's CPI is worse than a predetermined threshold (decision 1020). The predetermined threshold is a tunable value. Setting the threshold value high will reduce the number of identified poor performing threads, while, conversely, setting the value low will increase the number of identified poor performing threads. If the recently-completed thread's CPI is not worse than the threshold value, decision 1020 branches to "no" branch 1022 whereupon processing ends at 1025. On the other hand, if the recently-completed thread's CPI is worse than the threshold value, decision 1020 branches to "yes" branch 1028 to perform further processing in order to ultimately determine whether the recently-completed thread should be swapped to another processor.

At step 1030, previously-swapped thread data structure 1040 is read. This data structure contains information about threads that were previously swapped from one SMT processor to another and includes information such as the thread's identifier, the thread's CPI at the time at the time it was last swapped, and a timestamp indicating the last time the thread was swapped.

A determination is made as to whether the recently-completed thread was recently swapped (decision 1050). If the recently-completed thread was previously swapped, decision 1050 branches to "yes" branch 1055 whereupon a determination is made as to whether the recently-completed thread's CPI is worse after being swapped (decision 1060). If the recently-completed thread's CPI is not worse (i.e., it is the same or has improved) after being swapped, decision 1060 branches to "no" branch 1065 whereupon, at step 1070, the next worse performing thread is identified on the selected processor and processing loops back to determine if the newly identified thread is worse than the threshold, has been previously swapped, and whether the newly-identified thread's CPI is worse after being swapped. This looping continues until either the CPI of the identified threads (based upon the threads' CPIs) is better than the given threshold (at which point processing ends at 1025), or until a thread with a CPI worse than the threshold is identified that either has not been previously swapped (decision 1050 branching to "no" branch 1075) or has a worse CPI after being swapped (decision 1060 branching to "yes" branch 1078).

When a poor performing thread has been identified, a determination is made as to whether to include the identified thread in the swap list (decision 1080). This decision may be based on a variety of other factors, such as how recently the thread was previously swapped, how much better the thread performed on a different processor (i.e., a marginal improvement on a different processor may weigh against swapping the thread), and the like. If the determination is to still include the thread in the swap list, decision 1080 branches to "yes" branch 1082 whereupon, at step 1085, the swap list is updated by writing the thread's identifier to swap list 1090. On the other hand, if the determination is to not include the thread in the swap list, decision 1080 branches to "no" branch 1092 bypassing step 1085. Processing thereafter ends at 1095.

Figure 11:
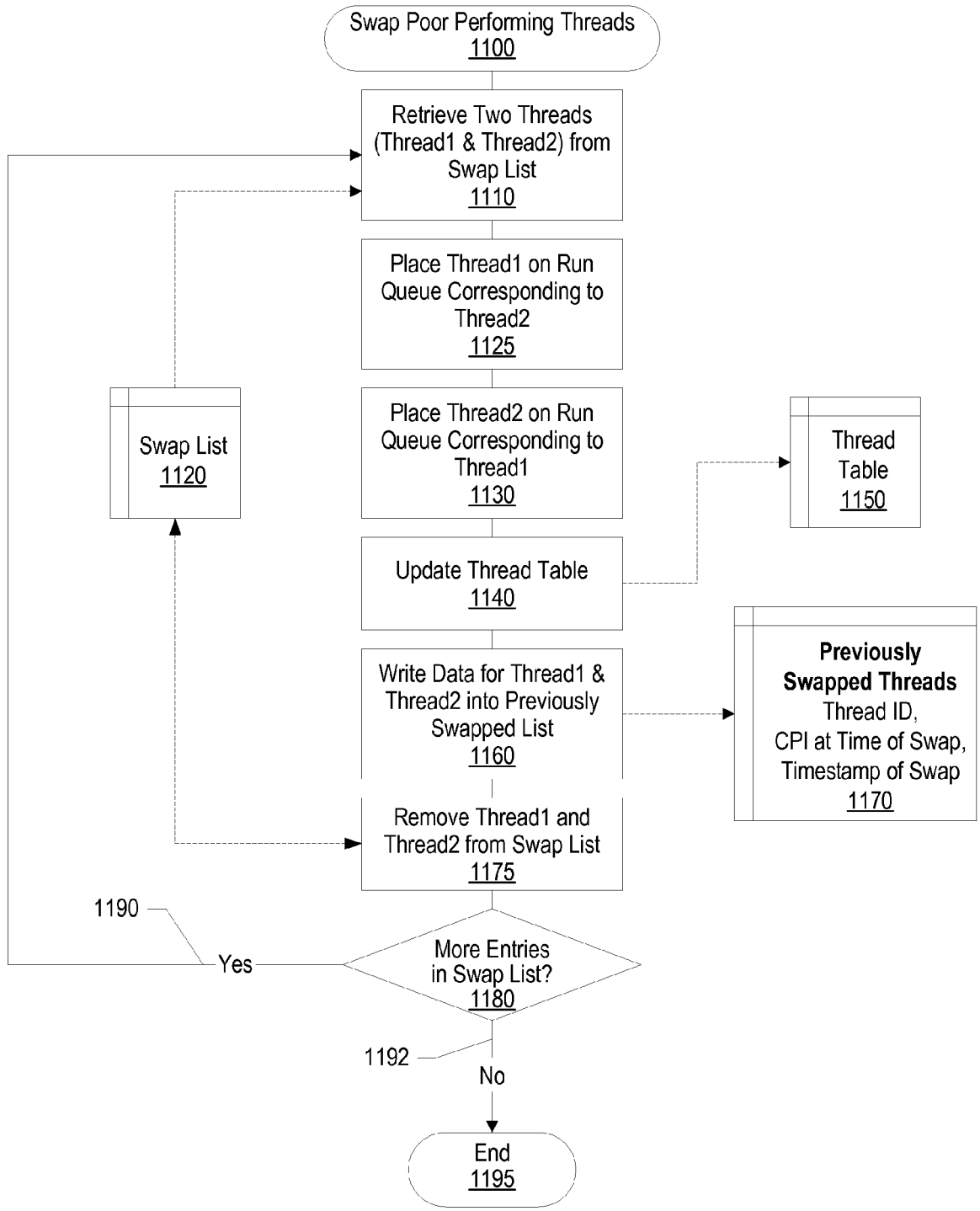
FIG. 11 is a flowchart showing the steps taken to swap poor performing threads between SMT processors.

FIG. 11 is a flowchart showing the steps taken to swap poor performing threads between SMT processors. Processing commences at 1100 whereupon, at step 1110, identifiers for two threads are retrieved from the swap list. In one embodiment, the swap list is used to swap threads from more than two SMT processors. The swap list therefore identifies both the threads and the SMT processor on which the thread last executed. In addition, the swap list may identify the processor to which the thread should be scheduled, based upon the thread's past performance on different processors. For example, in a system with four SMT processors where a poor performing thread has already been tried on the first, second, and third SMT processors, the swap list may indicate that the thread should be scheduled to run on the fourth SMT processor.

At step 1125, the first thread read from the swap list is placed on a different run queue (i.e., a run queue corresponding to a different SMT processor). At step 1130, the second thread read from the swap list is also placed on a different run queue. In one embodiment, the first thread is placed on the run queue corresponding to the second thread and the second thread is placed on the run queue corresponding to the first thread. At step 1140, thread table 1150 is updated reflecting the changes made to the threads' run queues. At step 1160, data pertaining to these threads is written to previously swapped thread data structure 1170. This data includes the threads' identifiers, the CPI of the threads at the time they were swapped, and the current timestamp indicating the time at which the threads were swapped.

At step 1175, the information corresponding to the threads that were just swapped to different run queues is removed from swap list 1120. A determination is made as to whether there are more entries in the swap list that need to be swapped (decision 1180). If there are additional entries in the swap list, decision 1180 branches to "yes" branch 1190 which loops back to swap the next two entries in the swap list (and remove the entries from the list). This looping continues until the swap list is empty, at which point decision 1180 branches to "no" branch 1192 and processing ends at 1195.

Figure 12:
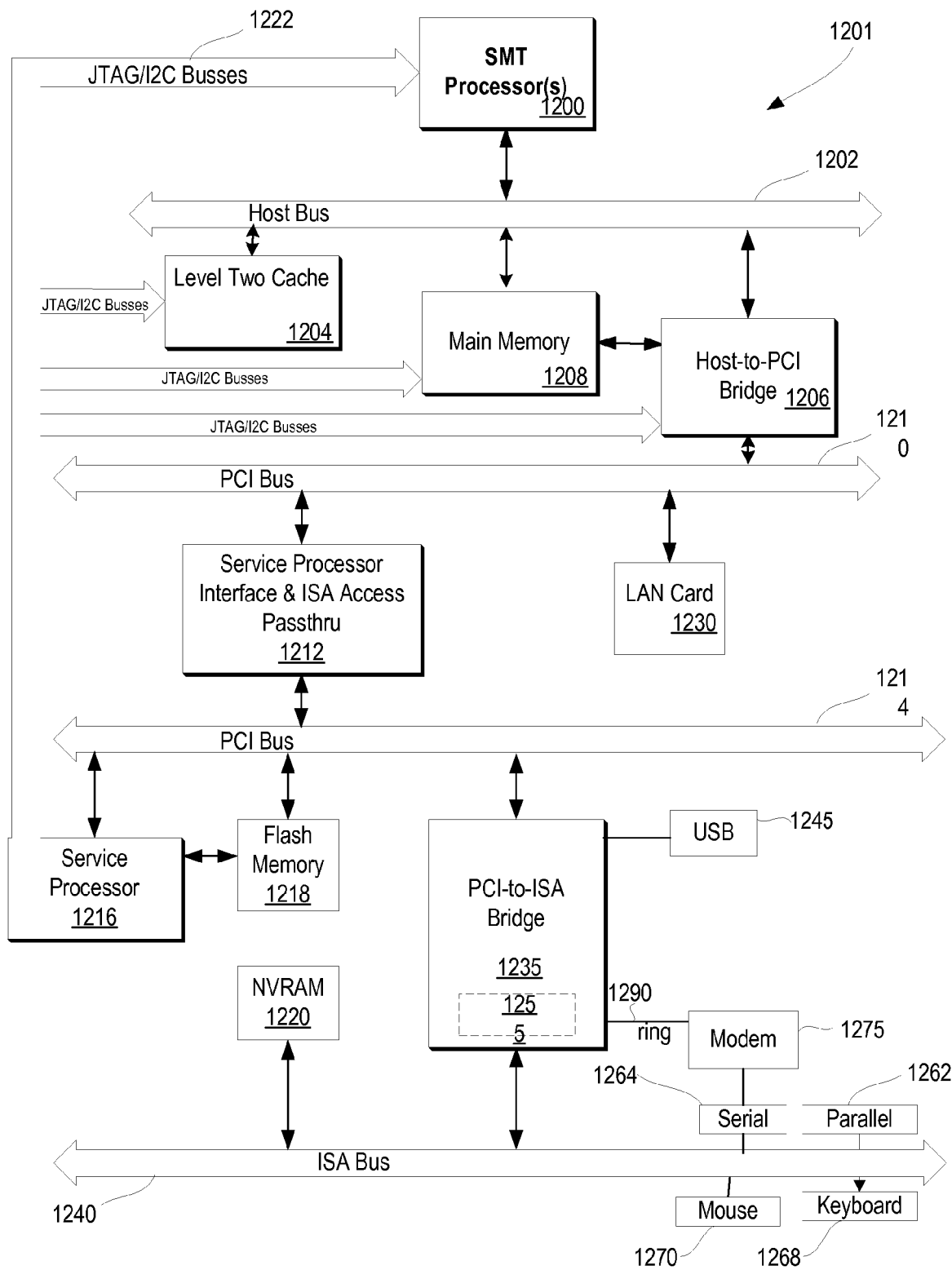
FIG. 12 is a block diagram of an information handling system capable of implementing the present invention.

FIG. 12 illustrates information handling system 1201 which is a simplified example of a computer system capable of performing the computing operations described herein. Computer system 1201 includes processor 1200 which is coupled to host bus 1202. A level two (L2) cache memory 1204 is also coupled to host bus 1202. Host-to-PCI bridge 1206 is coupled to main memory 1208, includes cache memory and main memory control functions, and provides bus control to handle transfers among PCI bus 1210, processor 1200, L2 cache 1204, main memory 1208, and host bus 1202. Main memory 1208 is coupled to Host-to-PCI bridge 1206 as well as host bus 1202. Devices used solely by host processor(s) 1200, such as LAN card 1230, are coupled to PCI bus 1210. Service Processor Interface and ISA Access Pass-through 1212 provides an interface between PCI bus 1210 and PCI bus 1214. In this manner, PCI bus 1214 is insulated from PCI bus 1210. Devices, such as flash memory 1218, are coupled to PCI bus 1214. In one implementation, flash memory 1218 includes BIOS code that incorporates the necessary processor executable code for a variety of low-level system functions and system boot functions.

PCI bus 1214 provides an interface for a variety of devices that are shared by host processor(s) 1200 and Service Processor 1216 including, for example, flash memory 1218. PCI-to-ISA bridge 1235 provides bus control to handle transfers between PCI bus 1214 and ISA bus 1240, universal serial bus (USB) functionality 1245, power management functionality 1255, and can include other functional elements not shown, such as a real-time clock (RTC), DMA control, interrupt support, and system management bus support. Nonvolatile RAM 1220 is attached to ISA Bus 1240. PCI-to-SCSI bridge 1280 provides bus control to handle transfers between PCI bus 1214 and SCSI bus 1285. SCSI device 1290 (i.e. a SCSI hard drive) communicates with other parts of computer system 1201 using SCSI bus 1285.

Service Processor 1216 includes JTAG and I2C busses 1222 for communication with processor(s) 1200 during initialization steps. JTAG/I2C busses 1222 are also coupled to L2 cache 1204, Host-to-PCI bridge 1206, and main memory 1208 providing a communications path between the processor, the Service Processor, the L2 cache, the Host-to-PCI bridge, and the main memory. Service Processor 1216 also has access to system power resources for powering down information handling device 1201.

Peripheral devices and input/output (I/O) devices can be attached to various interfaces (e.g., parallel interface 1262, serial interface 1264, keyboard interface 1268, and mouse interface 1270 coupled to ISA bus 1240. Alternatively, many I/O devices can be accommodated by a super I/O controller (not shown) attached to ISA bus 1240.

In order to attach computer system 1201 to another computer system to copy files over a network, LAN card 1230 is coupled to PCI bus 1210. Similarly, to connect computer system 1201 to an ISP to connect to the Internet using a telephone line connection, modem 1275 is connected to serial port 1264 and PCI-to-ISA Bridge 1235.

While the computer system described in FIG. 12 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. An information handling system comprising:
    a plurality of simultaneous multi-threading (SMT) processors;
    a memory accessible by the processors;
    a plurality of software threads and a plurality of run queues stored in the memory, wherein each of the run queues corresponds to one of the SMT processors;
    a thread scheduling tool for scheduling threads among the plurality of SMT processors, the thread scheduling tool comprising software code effective to:
    determine that a first thread from the plurality of software threads that is in a first run queue selected from the plurality of run queues is a poor performing thread, wherein the first run queue corresponds to a first SMT processor selected from the plurality of SMT processors, wherein the software code that performs the determination includes software code effective to:
        execute a plurality of threads listed in the first run queue, including the first thread, on the first SMT processor, the software code that performs the execution further including software code effective to:
            retrieve a number of cycles value for each thread indicating the number of cycles that occurred while each thread was executing;
            retrieve a number of instructions value for each thread indicating the number of instructions that were executed while each thread was executing;
            divide each number of cycles value by its corresponding number of instructions value, the dividing resulting in a cycles per instruction (CPI) value; and
            record the CPI value for each thread in the first queue; and
        identify the first thread as having a CPI value worse than a plurality of the other threads listed in the first run queue; and
    in response to the determination, the software code is effective to:
    write a first identifier corresponding to the first thread to a second run queue, wherein the second run queue corresponds to a second SMT processor selected from the plurality of SMT processors; and
    remove the first identifier from the first run queue.

2. The information handling system as described in claim 1 wherein the software code is further effective to:
    determine that a second thread in the second run queue is another poor performing thread;
    in response to the determination regarding the second thread:
        write a second identifier corresponding to the second thread to the first run queue; and
        remove the second identifier from the second run queue.

3. The information handling system as described in claim 1 wherein the software code is further effective to:
    determine whether each thread was previously moved from one of a plurality of SMT processors' run queues to the first SMT processor's run queue.

4. The information handling system as described in claim 3 wherein the software code is further effective to:
    determine that the CPI of the first thread has degraded since being moved to the first SMT processor's run queue.

5. The information handling system as described in claim 1 wherein the software code is further effective to:
    record the first thread's identifier, the first thread's CPI, and a timestamp to a previously swapped data structure.

6. The information handling system as described in claim 5 wherein the timestamp corresponds to a time selected from the group consisting of a time that the first thread's CPI was calculated, and a time that the first thread's identifier was moved from the first run queue to the second run queue.

7. The information handling system as described in claim 1 wherein the software code is further effective to:
    average the CPI value for each of the plurality of threads with one or more previous CPI values previously calculated for each of the threads, wherein the recorded CPI value includes the average CPI value for each thread.

8. The information handling system as described in claim 1 wherein the software code is further effective to:
skip one or more worse performing threads in comparison to the first thread in response to determining that each of the worse performing threads has previously been moved to the first SMT processor's run queue and each has improved in performance since being moved; and
identify the first thread after skipping the worse performing threads.

9. A computer program product stored on a computer operable media for scheduling threads for a plurality of simultaneous multi-threading (SMT) processors, said computer program product comprising:
means for determining that a first thread in a first run queue is a poor performing thread, wherein the first run queue corresponds to a first SMT processor, wherein the means for determining further includes:
means for executing a plurality of threads listed in the first run queue, including the first thread, on the first SMT processor, the means for executing further including:
means for retrieving a number of cycles value for each thread indicating the number of cycles that occurred while each thread was execution;
means for retrieving a number of instructions value for each thread indicating the number of instructions that were executed while each thread was executing;
means for dividing each number of cycles value by its corresponding number of instructions value, the dividing resulting in a cycles per instruction (CPI) value; and
means for recording the CPI value for each thread in the first queue; and
means for identifying the first thread as having a CPI value worse than a plurality of the other threads listed in the first run queue; and
in response to the determination:
means for writing a first identifier corresponding to the first thread to a second run queue, wherein the second run queue corresponds to a second SMT processor; and
means for removing the first identifier from the first run queue.

10. The computer program product as described in claim 9 further comprising:
means for determining that a second thread in the second run queue is another poor performing thread;
in response to the determination regarding the second thread:
means for writing a second identifier corresponding to the second thread to the first run queue; and means for removing the second identifier from the second run queue.

11. The computer program product as described in claim 9 further comprising:
means for determining whether each thread was previously moved from one of a plurality of SMT processors' run queues to the first SMT processor's run queue.

12. The computer program product as described in claim 11 further comprising:
means for determining that the CPI of the first thread has degraded since being moved to the first SMT processor's run queue.

13. The computer program product as described in claim 9 further comprising:
means for recording the first thread's identifier, the first thread's CPI, and a timestamp to a previously swapped data structure.

14. The computer program product as described in claim 13 wherein the timestamp corresponds to a time selected from the group consisting of a time that the first thread's CPI was calculated, and a time that the first thread's identifier was moved from the first run queue to the second run queue.

15. The computer program product as described in claim 9 further comprising:
means for averaging the CPI value for each of the plurality of threads with one or more previous CPI values previously calculated for each of the threads, wherein the recorded CPI value includes the average CPI value for each thread.

16. The computer program product as described in claim 9 further comprising:
means for skipping one or more worse performing threads in comparison to the first thread in response to determining that each of the worse performing threads has previously been moved to the first SMT processor's run queue and each has improved in performance since being moved; and
means for identifying the first thread after skipping the worse performing threads.

\* \* \* \* \*